(12) United States Patent
Matsumura et al.

(10) Patent No.: US 8,894,079 B2
(45) Date of Patent: Nov. 25, 2014

(54) UPPER SUPPORT FOR VEHICLE SUSPENSION

(71) Applicants: Tokai Rubber Industries, Ltd., Komaki (JP); Toyota Jidosha Kabushiki Kaisha, Toyota (JP)

(72) Inventors: Hiroyuki Matsumura, Komaki (JP); Yorikazu Nakamura, Kasugai (JP); Satoshi Uchida, Toyota (JP); Yusuke Washitani, Toyota (JP)

(73) Assignees: Tokai Rubber Industries, Ltd., Komaki-Shi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/793,236

(22) Filed: Mar. 11, 2013

(65) Prior Publication Data
US 2013/0249180 A1    Sep. 26, 2013

(30) Foreign Application Priority Data

Mar. 22, 2012   (JP) .................................. 2012-065065

(51) Int. Cl.
*B60G 15/06*   (2006.01)
*B60G 13/00*   (2006.01)
*B60G 99/00*   (2010.01)

(52) U.S. Cl.
CPC .......... *B60G 99/00* (2013.01); *B60G 2204/128* (2013.01); *B60G 13/003* (2013.01); *B60G 2204/41* (2013.01)
USPC ........ 280/124.155; 280/124.147; 188/321.11; 267/220

(58) Field of Classification Search
USPC ............... 188/321.11; 267/220; 280/124.147, 280/124.155
See application file for complete search history.

(56) References Cited

U.S. PATENT DOCUMENTS

| 4,248,454 A | * | 2/1981 | Cotter et al. | ............ 280/124.155 |
| 4,274,655 A | * | 6/1981 | Lederman | ............... 280/124.155 |
| 6,969,053 B2 | * | 11/2005 | Kawada et al. | ............... 267/292 |

FOREIGN PATENT DOCUMENTS

| JP | U-4-106540 | 9/1992 |
| JP | A-2002-227908 | 8/2002 |
| JP | A-2003-185025 | 7/2003 |
| JP | A-2006-168613 | 6/2006 |
| JP | A-2009-52651 | 3/2009 |
| JP | A-2011-85204 | 4/2011 |

OTHER PUBLICATIONS

Office Action issued in Japanese Patent Application No. 2012-065065 dated Jan. 16, 2014 (with partial translation).

* cited by examiner

*Primary Examiner* — Ruth Ilan
(74) *Attorney, Agent, or Firm* — Oliff PLC

(57) ABSTRACT

An upper support for vehicle suspension including: an inner cylindrical member; an outer cylindrical member spaced apart peripherally outward from the inner cylindrical member; a rubber elastic body interposed between the inner cylindrical member and the outer cylindrical member while elastically connecting the two members; and a flange portion extending radially outward from the outer cylindrical member while being adapted to be overlapped and fixed onto a mounting portion of a vehicle body. A fastening seat portion is provided to the flange portion over a prescribed area and has a contact face adapted to be in contact against the mounting portion of the vehicle body. A concave/convex portion is formed on the contact face of the fastening seat portion over a prescribed area thereof.

3 Claims, 3 Drawing Sheets

UPPER SUPPORT FOR VEHICLE SUSPENSION

INCORPORATED BY REFERENCE

The disclosure of Japanese Patent Application No. 2012-065065 filed on Mar. 22, 2012 including the specification, drawings and abstract is incorporated herein by reference in its entirety.

BACKGROUND OF THE INVENTION

1. Field of the Invention

The present invention relates to an upper support for vehicle suspension that fixes a shock absorber onto a mounting portion of a vehicle body in a vehicle suspension.

2. Description of the Related Art

Conventionally, in vehicle suspension mechanisms, a shock absorber and a mounting portion of the vehicle body are connected via an upper support for vehicle suspension (hereinafter called "upper support" as appropriate) in order to reduce vibration transmission from the wheel side to the vehicle body side through the shock absorber.

Such an upper support, as disclosed in Japanese Unexamined Patent Publication No. JP-A-2002-227908 for example, has a construction including:

an inner cylindrical member to which a shock absorber is adapted to be attached; an outer cylindrical member spaced apart peripherally outward from the inner cylindrical member and adapted to be mounted onto a mounting portion of a vehicle body; and a rubber elastic body connecting the inner and outer cylindrical members. With one end of the shock absorber elastically supported by the vehicle body, vibrations transmitted from the wheel side to the vehicle body side through the shock absorber will be suppressed.

As described in JP-A-2002-227908, the outer cylindrical member of the upper support includes a flange portion adapted to be overlapped with the mounting portion of the vehicle body, and the upper support is fixed to the vehicle body by means of a fastening member such as bolts via mounting holes formed in the flange portion. In many cases, the mounting portion of the vehicle body is formed by press working of a metal plate, and besides, the mounting portion sometimes be slightly waved due to punching of the bolt holes or the like. This may cause a slight gap between the flange portion of the upper support and the mounting portion of the vehicle body, at which the flange portion repeatedly comes into contact against and rebounds from the mounting portion of the vehicle body due to vibrations during driving or the like, posing a risk of making noises.

In order to address this problem, Japanese Unexamined Patent Publication No. JP-A-2003-185025 discloses a construction including a cushioning member made of an elastic body interposed between the outer cylindrical member and the mounting portion of the vehicle body. However, this construction has a problem of causing an increased number of components as well as increased assembly steps for attaching the cushioning member.

SUMMARY OF THE INVENTION

It is therefore one object of this invention to provide an upper support for vehicle suspension of novel construction which is able to reduce occurrence of noises through a simple structure without increase in the number of components.

The above and/or optional objects of this invention may be attained according to at least one of the following modes of the invention. The following modes and/or elements employed in each mode of the invention may be adopted at any possible optional combinations.

A first mode of the present invention provides an upper support for vehicle suspension including: an inner cylindrical member; an outer cylindrical member spaced apart peripherally outward from the inner cylindrical member; a rubber elastic body interposed between radially opposed faces of the inner cylindrical member and the outer cylindrical member while elastically connecting the inner and outer cylindrical members; a flange portion extending radially outward from the outer cylindrical member and having mounting holes at several locations in a circumferential direction, the flange portion being adapted to be overlapped and fixed onto a mounting portion of a vehicle body by a fastening member via the mounting holes; and a fastening seat portion provided to the flange portion over a prescribed area around each of the mounting holes and having a contact face adapted to be in contact against the mounting portion of the vehicle body, wherein a concave/convex portion is formed on the contact face of the fastening seat portion over a prescribed area thereof.

The upper support for vehicle suspension of construction according to the present invention is designed such that the flange portion of the outer cylindrical member includes a concave/convex portion formed on the contact face of the fastening seat portion which is adapted to be overlapped onto the mounting portion of the vehicle body. With this arrangement, the surface of the contact face has a concave/convex shape, so that the contact area against the mounting portion of the vehicle body can be made small. As a result, impact will be reduced when the contact face comes into contact against the mounting portion of the vehicle body, thereby decreasing occurrence of noises. Besides, since the contact area between the contact face and the mounting portion of the vehicle body is made small, large contact pressure can be applied on the mounting portion of the vehicle body, thereby minimizing misposition after the fastening as well.

Moreover, according to the present invention, noise reducing effect will be obtained simply by employing the specific shape of concave/convex shape on the surface of the contact face. That is, it is possible to obtain noise reducing effect through a simple structure without increase in the number of components, for example, requiring a separate component such as a cushioning member interposed between the outer cylindrical member and the mounting portion of the vehicle body.

A second mode of the present invention provides the upper support for vehicle suspension according to the first mode wherein an outside peripheral portion of the contact face of the fastening seat portion is a flat surface without the concave/convex portion.

The present mode enables the outside peripheral portion of the contact face to come into close contact with the mounting portion of the vehicle body.

This will reduce the risk of penetration of water between the contact face and the mounting portion of the vehicle body, thereby ensuring waterproofness.

A third mode of the present invention provides the upper support for vehicle suspension according to the first or second mode wherein the concave/convex portion has a mesh pattern.

According to the present mode, a multitude of concaves and convexes are alternately formed in continuous fashion on the surface of the contact face. Thus, the contact area of the contact face against the mounting portion of the vehicle body is effectively made small, so that noise reducing action and misposition preventing action will be effectively exhibited. In addition, instead of forming large concave parts, by forming relatively small concave parts in an alternate fashion with the convex parts, strength of the flange portion can also be obtained.

A fourth mode of the present invention provides the upper support for vehicle suspension according to any one of the first through third modes wherein the fastening seat portion projects toward the mounting portion of the vehicle body.

According to the present mode, the projecting end face of the fastening seat portion that projects from the flange portion constitutes the contact face. This arrangement reduces the contact area between the flange portion and the mounting portion of the vehicle body, making it possible to exhibit better noise reducing action and misposition preventing action in cooperation with the concave/convex portion of the contact face.

With the upper support for vehicle suspension constructed in accordance with the present invention, the fastening seat portion includes the concave/convex portion formed over a prescribed area on the contact face that is adapted to come into contact against the mounting portion of the vehicle body. This arrangement reduces the contact area of the fastening seat portion against the mounting portion of the vehicle body, thereby decreasing occurrence of noises during contact between the fastening seat portion and the mounting portion of the vehicle body. As a result, the upper support is able to reduce occurrence of noises through a simple structure without increase in the number of components.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
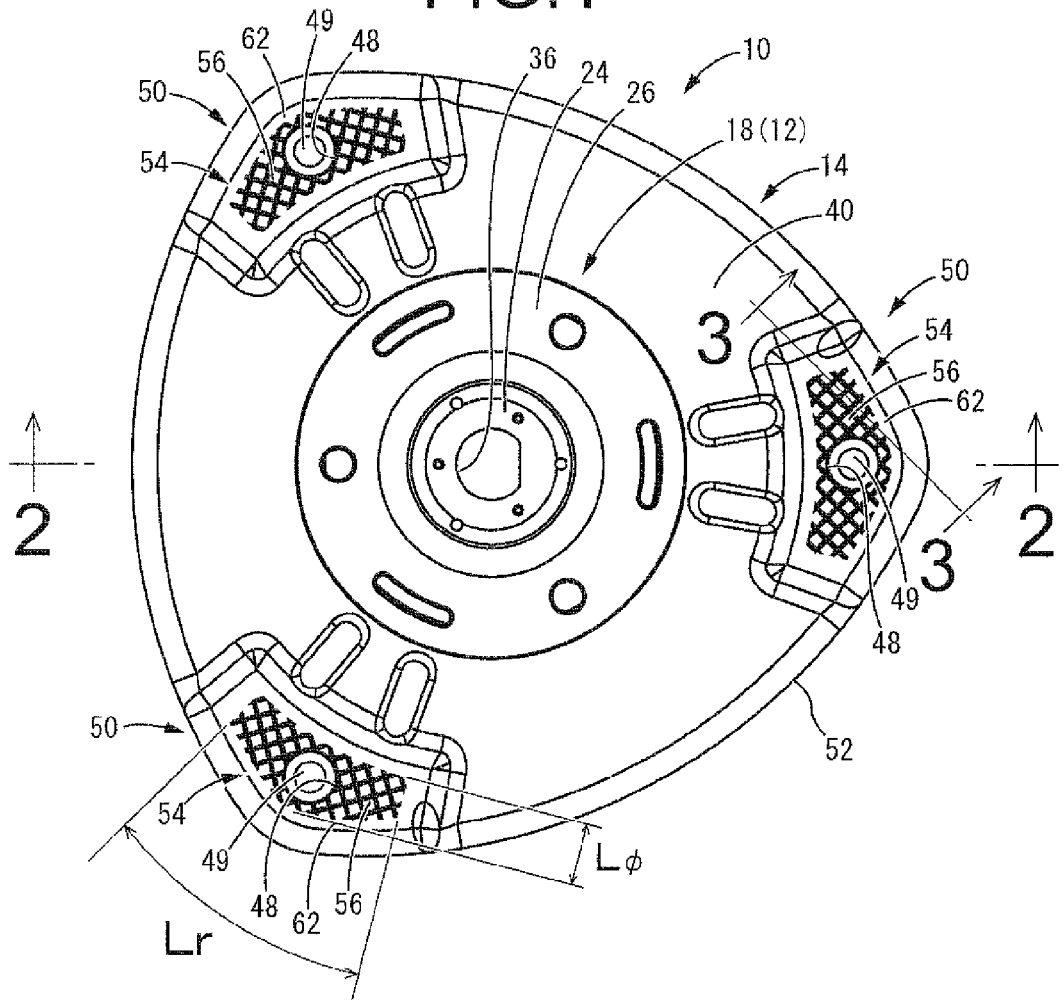
FIG. 1 is a top plane view of an upper support as a first embodiment of the present invention.
Figure 2:
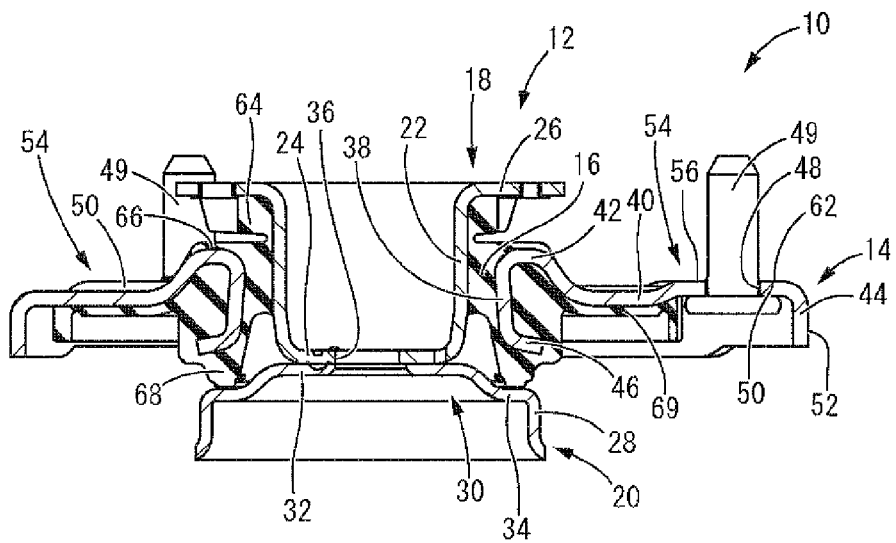
FIG. 2 is a cross sectional view taken along line 2-2 of FIG. 1.

Referring first to FIGS. 1 and 2, there is depicted an upper support for vehicle suspension 10 (hereinafter called "upper support" as appropriate) according to a first embodiment of the present invention. The upper support 10 has a structure in which an inner cylindrical member 12 and an outer cylindrical member 14 spaced apart peripherally outward from the inner cylindrical member 12 are elastically connected by a rubber elastic body 16 interposed between radially opposed faces of the inner cylindrical member 12 and the outer cylindrical member 14. In the description hereinbelow, unless otherwise indicated, the vertical direction refers to the vertical direction in FIG. 2.

The inner cylindrical member 12 includes a first inner cylinder 18 and a second inner cylinder 20 each made of a metal such as steel or the like. The first inner cylinder 18 has a generally cup shape that opens upward, including an upper cylindrical portion 22 of generally cylindrical shape and a bottom portion 24 integrally formed with one axial end edge of the upper cylindrical portion 22 (the lower side in FIG. 2) so as to have a bottomed shape. On the other axial end edge of the upper cylindrical portion 22 (the upper side in FIG. 2), integrally formed is an upper stopper portion 26 of flange shape that flares radially outward from the upper cylindrical portion 22 in a generally annular disk shape. Meanwhile, the second inner cylinder 20 has a generally cylindrical shape with a bottom that opens on the opposite side to the first inner cylinder 18 (the lower side in FIG. 2), including a lower cylindrical portion 28 of cylindrical shape with a slightly larger diameter than the upper cylindrical portion 22 of the first inner cylinder 18 and a top wall 30 integrally formed with one axial end edge of the lower cylindrical portion 28 (the upper side in FIG. 2). The top wall 30 has a stepped shape such that a center part 32 projects upward, and at the outside peripheral portion of the top wall 30 there is formed a lower stopper portion 34 of shoulder shape that flares radially outward from the center part 32.

The first inner cylinder 18 and the second inner cylinder 20 are disposed coaxially, and then the bottom portion 24 of the first inner cylinder 18 and the top wall 30 of the second inner cylinder 20 are connected by welding or the like. By so doing, the inner cylindrical member 12 is provided. On the center axis of the inner cylindrical member 12, a center hole 36 is formed so as to pass through the bottom portion 24 of the first inner cylinder 18 as well as the top wall 30 of the second inner cylinder 20. Note that as depicted in FIG. 1, the center hole 36 according to the present embodiment has a shape such that a portion of a circle is cut out.

On the other hand, the outer cylindrical member 14 is made of a metal such as steel or the like, and is integrally equipped with a cylindrical wall portion 38 with a larger diameter than the upper cylindrical portion 22 of the inner cylindrical member 12, and a flange portion 40 that extends radially outward from the axially middle position of the cylindrical wall portion 38. In particular, the outer cylindrical member 14 according to the present embodiment is formed by pressing a steel plate, and the cylindrical wall portion 38 has a tapered cylindrical shape whose diameter progressively becomes larger towards the bottom in the axial direction. The cylindrical wall portion 38 is bent at its axially upper end portion outward in the radial direction, thereby providing an upper support wall 42 that extends in the axis-perpendicular direction. Then, the radially outer end edge of the upper support wall 42 is bent downward into tapered contours, and further extends outward in the radial direction. By so doing, a flange portion 40 is provided. In addition, the flange portion 40 is bent downward at its outer peripheral edge, thereby providing an annular reinforcing claw 44. Meanwhile, the cylindrical wall portion 38 flares at its axially lower end edge with an even larger taper angle, so as to form a lower support wall 46 that extends approximately in the axis-perpendicular direction.

As depicted in FIG. 1, the flange portion 40 has a generally equilateral triangle shape in which each side slightly curves in plan view, and each apex is rounded into a generally arcuate shape. The flange portion 40 is perforated by bolt holes 48 functioning as mounting holes at several locations in the circumferential direction. In the present embodiment, each bolt hole 48 is formed at the center of a prescribed area that corresponds to each apex of the generally equilateral triangle of the flange portion 40. Accordingly, three bolt holes 48 are provided at approximately equal intervals in the circumferential direction of the flange portion 40. A mounting bolt 49 functioning as a fastening member is inserted into each of the bolt holes 48 and fixed thereto. In addition, the prescribed area around each of the bolt holes 48 that corresponds to each apex of the generally equilateral triangle defines a fastening seat portion 50.

The fastening seat portion 50 according to the present embodiment includes the area projecting upward (toward the vehicle body) around the bolt hole 48 of the flange portion 40. In the present embodiment, three fastening seat portions 50 are generally identical with one another in shape, and are formed around the bolt holes 48 over the prescribed area in the circumferential and radial direction of the flange portion 40. Note that each fastening seat portion 50 reaches an outer peripheral edge 52 of each apex of the flange portion 40.

Figure 3:
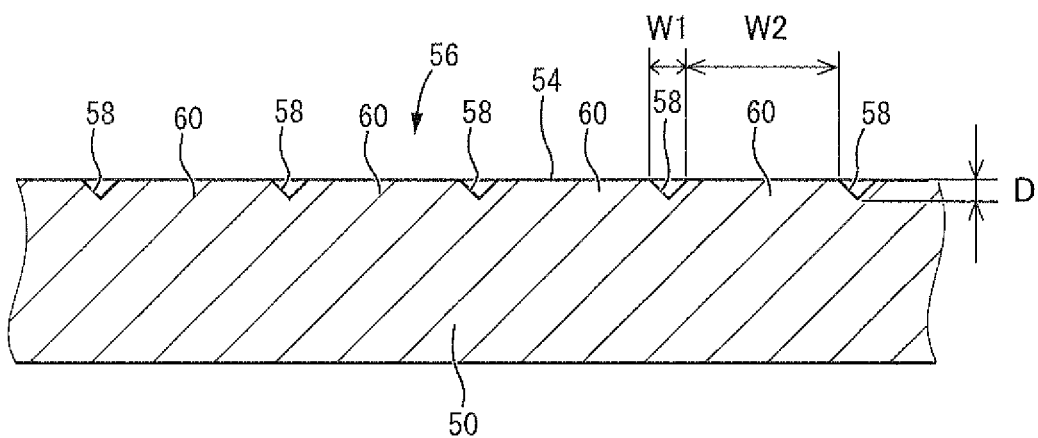
FIG. 3 is a schematic view showing an enlarged cross section taken along line 3-3 of FIG. 1.

Besides, the fastening seat portion 50 has a contact face 54 defined by its projecting end face. The contact face 54 has a concave/convex portion 56 formed over a prescribed area thereof. As depicted in FIG. 3, the concave/convex portion 56 includes a plurality of concave parts 58 and a plurality of convex parts 60 that are relatively convex between the concave parts 58. In the present embodiment, each concave part 58 has a triangular cross sectional shape and extends in a linear pattern. While the specific shape of the concave/convex portion 56 is not limited in particular, in the present embodiment, the plurality of linear concave parts 58 cross orthogonally at prescribed intervals so as to take on a lattice pattern. Accordingly, in plan view, the concave/convex portion 56 has a mesh pattern.

The size and shape of the concave/convex portion 56 in plan view, and the specific dimensions of the concave part 58 such as the depth dimension can be desirably established in consideration of the specific shape of the flange portion 40 or required noise reducing effect or the like. For example, with regard to the size of the concave/convex portion 56 in plan view (see FIG. 1), the maximum dimension: Lr of the flange portion 40 in the circumferential direction is set within the range such that 15 mm ≤Lr≤50 mm, and preferably within the range 20 mm≤Lr≤40 mm, while the maximum dimension: Lø of the flange portion 40 in the radial direction is set within the range such that 10 mm≤Lø≤25 mm, and preferably within the range 15 mm≤Lø≤20 mm. This is because, with respect to the concave/convex portion 56, if the maximum dimension: Lr of the flange portion 40 in the circumferential direction is smaller than 15 mm or the maximum dimension: Lø of the flange portion 40 in the radial direction is smaller than 10 mm, there is a risk that the formation area of the concave/convex portion 56 may be too small to achieve effective noise reducing action or the like. On the contrary, if the maximum dimension: Lr of the flange portion 40 in the circumferential direction is greater than 50 mm or the maximum dimension: Lø of the flange portion 40 in the radial direction is greater than 25 mm, there is a risk of losing strength of the flange portion 40.

Meanwhile, the depth dimension: D of the concave part 58 (see FIG. 3) is preferably set within the range such that 0.1 mm≤D≤0.9 mm, and more preferably within the range 0.2 mm≤D≤0.5 mm. This is because, if the depth dimension: D of the concave part 58 is smaller than 0.1 mm, the concave/convex portion 56 will substantially be a flat surface and there is a risk that the required noise reducing effect or the like may not be achieved. On the contrary, if the depth dimension: D of the concave part 58 is greater than 0.9 mm, there is a risk of losing strength of the flange portion 40. Additionally, in the case where a plurality of concave parts 58 are formed in a lattice pattern as in the present embodiment, the widthwise dimension: W1 of each concave part 58 on the contact face 54 is preferably set within the range such that 0.1 mm≤W1≤1.0 mm, and more preferably within the range 0.4 mm≤W1≤0.8 mm, while the widthwise dimension: W2 of each convex part 60 formed between the concave parts 58, 58 on the contact face 54 is preferably set within the range such that 1.0 mm≤W2≤5.0 mm, and more preferably within the range 2.0 mm≤W2≤4.0 mm. This is because, if the widthwise dimension: W1 of the concave part 58 is smaller than 0.1 mm or the widthwise dimension: W2 of the convex part 60 is greater than 5.0 mm, a flat surface will take a large area in the concave/convex portion 56 and there is a risk that effective noise reducing action may not be achieved. On the contrary, if the widthwise dimension: W1 of the concave part 58 is greater than 1.0 mm or the widthwise dimension: W2 of the convex part 60 is smaller than 1.0 mm, there is a risk of losing strength of the flange portion 40.

It should be appreciated that the concave/convex portion 56 according to the present embodiment is formed over a prescribed area at the center of the contact face 54 excluding the outside peripheral portion thereof. With this arrangement, the outside peripheral portion of the contact face 54 is a flat surface 62 without the concave/convex portion 56, so that the concave/convex portion 56 is surrounded by the flat surface 62 about the entire circumference. Accordingly, on the outer peripheral edge 52 side of the concave/convex portion 56, the flat surface 62 is provided across the entire length.

Then, the outer cylindrical member 14 is externally fitted onto the inner cylindrical member 12 and coaxially disposed while being spaced apart radially outward therefrom. With this arrangement, the outside peripheral face of the upper cylindrical portion 22 of the inner cylindrical member 12 and the inside peripheral face of the cylindrical wall portion 38 of the outer cylindrical member 14 are situated in opposition in the radial direction. In addition, the rubber elastic body 16 is interposed between radially opposed faces of the upper cylindrical portion 22 and the cylindrical wall portion 38. The rubber elastic body 16 has a thick-walled annular block shape overall, and its inside peripheral face is bonded by vulcanization to the upper cylindrical portion 22. Meanwhile, the cylindrical wall portion 38 is entirely embedded in the rubber elastic body 16 and bonded by vulcanization thereto. By so doing, the rubber elastic body 16 takes the form of an integrally vulcanization molded component incorporating the inner cylindrical member 12 and the outer cylindrical member 14, thereby elastically connecting the inner cylindrical member 12 and the outer cylindrical member 14 with each other.

Moreover, on the lower face of the upper stopper portion 26 of the inner cylindrical member 12, an upper cushion rubber 64 is integrally formed with the rubber elastic body 16 and projects downward in the axial direction. In addition, on the upper support wall 42 of the outer cylindrical member 14 that is axially opposed to the upper cushion rubber 64, a thin-walled rubber sheath layer 66 is integrally formed with the rubber elastic body 16 so as to cover the surface of the upper support wall 42. With the upper support 10 in the isolated state prior to installation in the automobile, these upper cushion rubber 64 and the rubber sheath layer 66 are situated in opposition while being slightly spaced apart in the axial direction from each other. On the other hand, on the lower face of the lower support wall 46 of the outer cylindrical member 14, a lower cushion rubber 68 is integrally formed with the rubber elastic body 16 and projects downward in the axial direction. With the upper support 10 in the isolated state prior to installation in the automobile, the lower cushion rubber 68 is situated in contact against the lower stopper portion 34 of the second inner cylinder 20 that constitutes the inner cylindrical member 12.

With this arrangement, upon input of heavy load across the inner cylindrical member 12 and the outer cylindrical member 14 in the axial direction, the upper cushion rubber 64 comes into contact against the rubber sheath layer 66, and the lower stopper portion 34 of the inner cylindrical member 12 comes into contact against the lower cushion rubber 68. By so doing, the amount of displacement of the inner cylindrical member 12 and the outer cylindrical member 14 relative to each other, and hence the amount of elastic deformation of the rubber elastic body 16, are effectively limited in both the rebound and bound directions. Furthermore, the rubber elastic body 16 extends out from the lower cushion rubber 68 along the outside peripheral face of the cylindrical wall portion 38 and then along the lower face of the flange portion 40.

With this arrangement, on the lower face of the flange portion 40 there is formed a lower rubber sheath layer 69.

Figure 4:
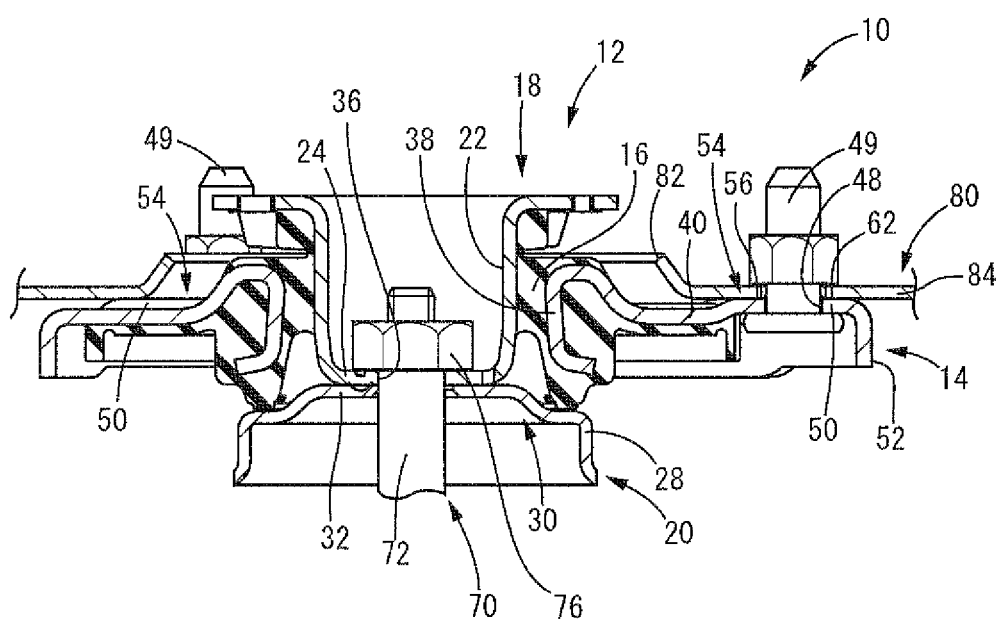
FIG. 4 is a cross sectional view of the upper support of FIG. 1 installed in an automobile.

As schematically depicted in FIG. 4, during installation of the upper support 10 constructed in the above manner to the automobile, the upper end portion of a piston rod 72 of a shock absorber 70 that constitutes the automotive suspension mechanism is inserted into the center hole 36 of the inner cylindrical member 12 and projects into the internal space of the first inner cylinder 18, while being engaged to the bottom portion 24 of the inner cylindrical member 12 by a fastening nut 76 threaded onto the piston rod 72. By so doing, the piston rod 72 of the shock absorber 70 is coaxially attached to the inner cylindrical member 12. In the present embodiment, the piston rod 72 is directly fixed to the inner cylindrical member 12. However, it would also be acceptable for example that a radial ball bearing is provided inside the inner cylindrical member 12 and the upper end portion of the piston rod 72 is anchored to the inner ring of the radial ball bearing, thereby attaching the piston rod 72 to the inner cylindrical member 12 rotatably about the center axis via the radial ball bearing.

On the other hand, with regard to the outer cylindrical member 14, the contact face 54 of the fastening seat portion 50 is overlapped onto the lower face of a flat mounting portion 84 of a vehicle body 80 formed around an installation hole 82, and then fixed in a state of close contact thereto by the mounting bolt 49. Therefore, the flange portion 40 is arranged such that only the contact face 54 of the fastening seat portion 50 is in contact against the mounting portion 84.

In this way, the upper support 10 is installed in the automobile so as to elastically connect and support the shock absorber 70 on the vehicle body 80 (the mounting portion 84), thereby reducing vibrations transmitted from the wheel side to the vehicle body 80 side through the shock absorber 70.

Here, in the upper support 10 of construction according to the present embodiment, the concave/convex portion 56 is provided on the contact face 54 of the fastening seat portion 50 adapted to be overlapped onto the mounting portion 84 of the vehicle body 80. With this arrangement, contact area of the contact face 54 against the mounting portion 84 is made smaller, so that impact will be reduced when the contact face 54 is separated from the mounting portion 84 and then comes into contact thereagainst due to vibrations or the like during driving, thereby decreasing occurrence of noises. In addition, large contact pressure can be applied on the mounting portion 84, making it possible to minimize misposition after the fastening as well. Besides, according to the present embodiment, simply by forming the concave/convex portion 56 of specific shape on the contact face 54, it is possible to obtain noise reducing effect and misposition preventing effect through a simple structure without increase in the number of components.

In particular, the fastening seat portion 50 projects partly from the flange portion 40 toward the mounting portion 84. Thus, the contact area between the mounting portion 84 and the flange portion 40 can be made even smaller, thereby achieving more effective noise reducing action. Moreover, the concave/convex portion 56 has a mesh pattern where a multitude of concave parts 58 and the convex parts 60 are alternately formed in continuous fashion. With this arrangement, the contact area between the contact face 54 and the mounting portion 84 can be effectively made smaller. Besides, by providing the convex parts 60 between the concave parts 58, strength of the flange portion 40 will be obtained. Furthermore, since a multitude of convex parts 60 are formed in a parallel arrangement, it is possible to attain better misposition preventing effect as well.

Additionally, the concave/convex portion 56 is formed at the center portion of the contact face 54 while the flat surface 62 is formed in the outside peripheral portion of the contact face 54. This arrangement enables the contact face 54 to come into close contact with the mounting portion 84 at the flat surface 62, thereby minimizing penetration of water between the flange portion 40 and the mounting portion 84. In particular, since the flat surface 62 is positioned in the outer peripheral edge 52 side of the flange portion 40, penetration of water will be effectively prevented.

An embodiment of the present invention has been described in detail above, but the present invention is not limited to those specific descriptions. For example, the cross sectional shape of the concave parts 58 is not limited to the triangular shape as taught in the preceding embodiment, but may be rectangular, semicircular, or other shape. Also, the shape of the concave/convex portion 56 in plan view is not limited to the mesh pattern as taught in the preceding embodiment, but any shape may be employed in consideration of the shape of the mounting portion of the vehicle body or the like.

Moreover, the flat surface 62 according to the preceding embodiment is not always required. For example, the concave/convex portion 56 may be provided over the entire face of the contact face 54 or the like. Furthermore, the fastening seat portion 50 need not necessarily project from the flange portion 40. In addition, the number of the concave/convex portion 56 formed on the flange portion 40 is, of course, not limited at all.

What is claimed is:

1. An upper support for vehicle suspension comprising:
an inner cylindrical member;
an outer cylindrical member spaced apart peripherally outward from the inner cylindrical member;
a rubber elastic body interposed between radially opposed faces of the inner cylindrical member and the outer cylindrical member while elastically connecting the inner and outer cylindrical members;
a flange portion extending radially outward from the outer cylindrical member and having mounting holes at several locations in a circumferential direction, the flange portion being adapted to be overlapped and fixed onto a mounting portion of a vehicle body by a fastening member via the mounting holes; and
a fastening seat portion provided to the flange portion over a prescribed area around each of the mounting holes and having a contact face adapted to be in contact against the mounting portion of the vehicle body,
wherein a concave/convex portion is formed on the contact face of the fastening seat portion over a prescribed area thereof, and
an outside peripheral portion of the contact face of the fastening seat portion is a flat surface without the concave/convex portion so that the concave/convex portion is surrounded by the flat surface about an entire circumference, and the flat surface is adapted to come into close contact with the mounting portion of the vehicle body.

2. The upper support for vehicle suspension according to claim 1, wherein the concave/convex portion has a mesh pattern.

3. The upper support for vehicle suspension according to claim 1, wherein the fastening seat portion projects toward the mounting portion of the vehicle body.

\* \* \* \* \*